US006501946B1

United States Patent
Farah et al.

(10) Patent No.: US 6,501,946 B1
(45) Date of Patent: Dec. 31, 2002

(54) MULTIPLE UNIQUELY DISTINGUISHABLE WIRELESS HANDSETS USING A SINGLE MOBILE IDENTIFICATION NUMBER

(75) Inventors: Jeffrey J. Farah, North Brunswick, NJ (US); Bernard S. Renger, New Providence, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/324,734

(22) Filed: Jun. 3, 1999

(51) Int. Cl.[7] ............................................. H04M 11/00
(52) U.S. Cl. ...................... 455/414; 455/435; 455/551; 455/560
(58) Field of Search ................................. 455/414, 409, 455/415, 416, 445, 461, 462, 463, 466, 433, 435, 551, 552, 560, 554, 555

(56) References Cited

U.S. PATENT DOCUMENTS 5,676,638 A * 10/1997 Ogasawara et al. ......... 455/555
5,699,407 A * 12/1997 Nguyen ...................... 455/414
5,806,000 A *  9/1998 Vo et al. ..................... 455/445
6,393,275 B1 *  5/2002 Alfred ........................ 455/422

* cited by examiner

Primary Examiner—Lester G. Kincaid
(74) Attorney, Agent, or Firm—Morgan & Finnegan (57) ABSTRACT

A system, method, and computer program product that permits multiple uniquely identifiable handsets to use the same mobile identification number (MIN). The apparatus includes a wireless phone including an electronic serial number (ESN) and an extended MIN (EMIN), the EMIN including a MIN identifying a plurality of wireless phones and an extension code identifying the specific wireless phone within the plurality of wireless phones that includes it; an adjunct processor that generates control codes according to a network-based profile identified by the EMIN; and a mobile switching center that activates a services plan according to the control codes, thereby providing telecommunication service access to the wireless phone.

26 Claims, 4 Drawing Sheets

MULTIPLE UNIQUELY DISTINGUISHABLE WIRELESS HANDSETS USING A SINGLE MOBILE IDENTIFICATION NUMBER

BACKGROUND OF THE INVENTION

1. Field of the Invention

The present invention relates generally to wireless communications, and more particularly to sharing a single mobile identification number between multiple uniquely distinguishable wireless handsets.

2. Related Art

Wireless phones are experiencing a dramatic increase in popularity. As handset size and service costs decline, the wireless phone is rapidly becoming the phone of choice. For many users, it has displaced the conventional wireline phone completely.

However, the wireline phone continues to have some advantages over the wireless phone. In particular, some features available with wireline phones are not available for wireless phones. One feature of particular utility is the common telephone "extension." This feature provides a host of advantages.

For example, in a consumer environment, a phone call to a residence can easily be passed from extension to extension. Unfortunately, this feature is not currently available for wireless phones.

As another example, in a business environment, a caller can dial a single number to reach a receptionist, who can then direct the call to individual telephone extensions as desired. The extension feature also permits a number of interoffice services such as conference calling and call transfer. Unfortunately, this feature is not currently available in wireless telephony.

SUMMARY OF THE INVENTION

The present invention is a system, method, and computer program product that permits multiple uniquely identifiable handsets to use the same mobile identification number (MIN).

The apparatus includes a wireless phone including an electronic serial number (ESN) and an extended mobile identification number (EMIN), the EMIN including a mobile identification number (MIN) identifying a plurality of wireless phones and an extension code identifying the specific wireless phone within the plurality of wireless phones that includes it; an adjunct processor that generates control codes according to a network-based profile identified by the EMIN and a mobile switching center that activates a services plan according to the control codes, thereby providing telecommunication service access to the wireless phone.

The method includes transmitting from a wireless phone an electronic serial number (ESN) and an extended mobile identification number (EMIN), the EMIN including a mobile identification number (MIN) identifying a plurality of wireless phones and an extension code identifying the specific wireless phone within the plurality of wireless phones that includes it; generating, at an adjunct processor, control codes according to a network-based profile identified by the EMIN; and activating, at a mobile switching center, a services plan according to the control codes, thereby providing telecommunication service access to the wireless phone.

One advantage of the present invention is that it permits a plurality of wireless handsets to share a single mobile identification number (MIN).

Another advantage of the present invention is that it provides a user-manageable profile associated with the MIN.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

The present invention is a system, method, and computer program product that permits multiple uniquely identifiable handsets to use the same mobile identification number (MIN), thereby extending the concept of the wired-line extension into the wireless communication environment, and facilitating new services based upon the new concept of wireless extensions.

An extended MIN (EMIN) is programmed into the cellular number at service activation instead of the conventional MIN. The EMIN includes the traditional MIN followed by an extension code identifying a particular extension.

A profile is provided for each extension. The profile can be stored at a network-based service control point, at a mobile switching center, or elsewhere within the network. The profile identifies the services that can be executed and/or used by the extension. It is in this network-based profile that the services assigned to the extension are kept, monitored, updated, and the like. Services can be function-code based (for example, intercom) or traditional services such as outbound services.

The profile can contain a variety of information regarding calling limitations such as area code, time of day, day of the month, and the like. Likewise, the calling can be restricted to local, national instead of international, or merely restricted to a certain predetermined set of telephone numbers. These calling limitations can be placed on outbound calls and/or inbound calls based on data such as automatic number identification (ANI).

The profile can also limit the functions of the handset itself based on parameters such as time of day. For example, the profile can specify that the handset should not ring for incoming calls received late at night. As another example, the profile can specify alternative destinations based on time of day. For example, the profile can specify that all calls received at a business extension after business hours be routed directly to voice mail. Or to a supervisor's phone number. The profile can also contain conventional profile information, such as user name and billing information.

On activation, the wireless phone sends its EMIN/ESN doublet to a mobile switching center (MSC). Either the MSC or a service control point (SCP) authenticates the ESN/EMIN pair and identifies the service elements accessible by the wireless phone, based upon the profiles stored for the EMIN.

A considerable number of services can be built around the present invention. For example, the present invention supports an intercom service that permits a handset-to-handset telephone call. This quick-dial feature allows calls from one wireless phone to another wireless phone when both phones share a MIN. According to this feature, the user can simply enter a command character and the number of the extension. For example, a caller can dial "*234" to dial the extension assigned extension code 234.

Another example is a keep safe functionality. Based upon the extension code and time of day, the wireless phone profile limits the phone functionality to calling the police, fire department, and/or a home phone number. This function is especially useful for a parent who has a teenager who stays out late.

Another example service is a family conferencing function. The common MIN is exploited to call all of the extensions for the MIN at the same time and place the parties on a conference call. Of course, less than the full set of extensions can be placed on a conference call if desired.

Another example service allows a caller to dial all of the extensions simultaneously. For example, when prompted for the extension code, the caller can enter "0" to ring, all of the extension codes for the called MIN.

Another example service allows a caller to dial the MIN and XC together as a single data entry. For example, the MIN may be entered, followed by a character such as "*", followed by the XC.

Of course, each extension can also operate independently and simultaneously, as with conventional wireless phones.

A feature of particular usefulness is that the profile can be managed and modified by the user. In one embodiment, the profile is accessed over the Internet using a web browser. In another embodiment, a user accesses his profile using a telephone. Voice recognition may be used to facilitate modification of the profile. In one embodiment, a single profile is provided for all of the extensions served by a single MIN. In another embodiment, each extension has its own profile. In either embodiment, the profile may be managed by any of the users, or only by a designated user.

Figure 1:
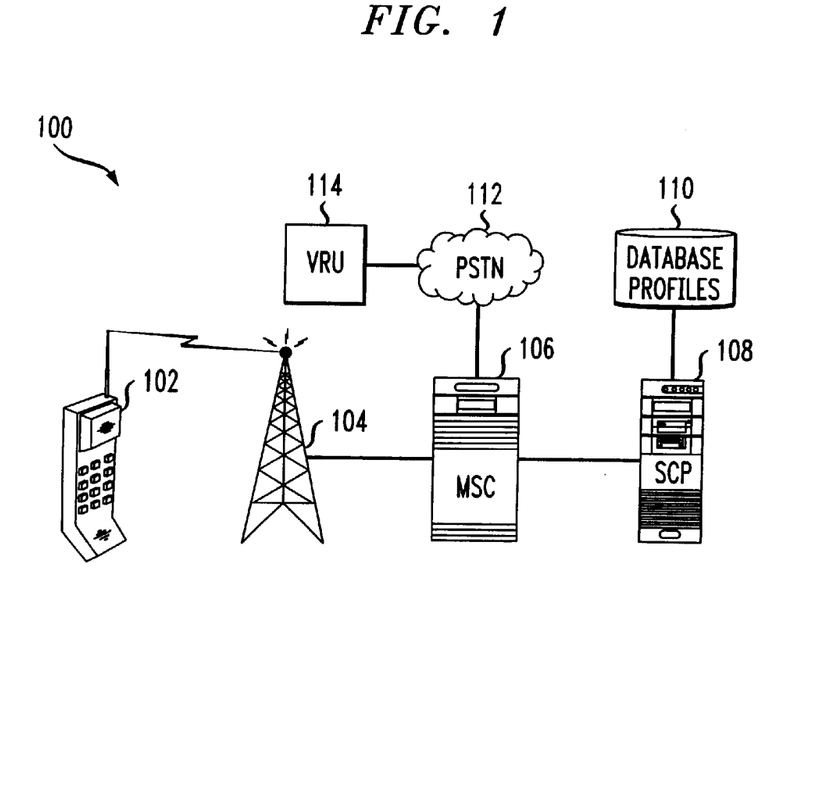
FIG. 1 depicts a communication system in which the present invention is useful.

FIG. 1 depicts a communication system in which the present invention is useful. This system includes a wireless phone 102, a base station 104, a mobile switching center (MSC) 106, a service control point (SCP) 108, a database 110, a public switched telephone network (PSTN) 112, and a voice response unit (VRU) 114. The structure and functions of these elements are well-known in the relevant arts. In system 100, base station 104 can be replaced by equivalent structures, such as a cell tower or other wireless receiver, as would be apparent to one skilled in the relevant arts.

Figure 2:
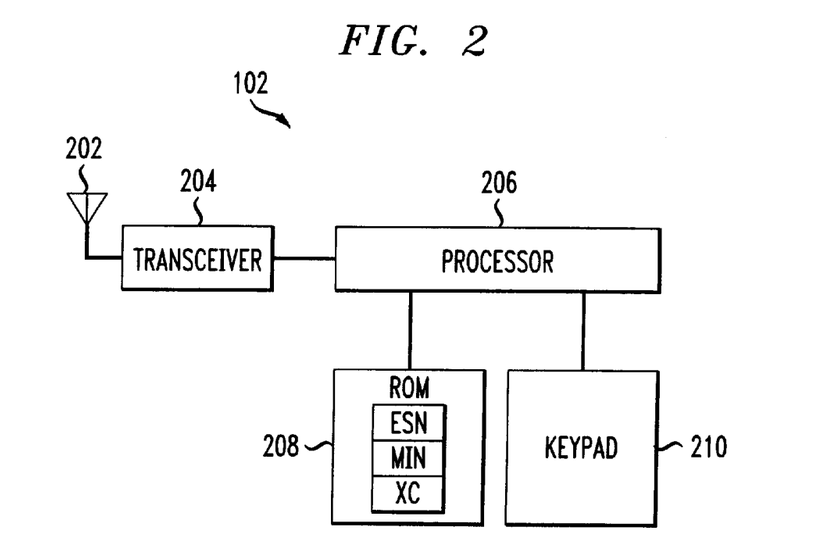
FIG. 2 is a functional block diagram of a wireless phone according to a preferred embodiment.

FIG. 2 is a functional block diagram of wireless phone 102 according to a referred embodiment. Wireless phone 102 includes an antenna 202, a transceiver 204, a processor 206, a memory 208, and a keypad 210. In a preferred embodiment, memory 208 includes a read-only memory (ROM) section. ROM section of memory 208 includes three parameters: an electronic serial number (ESN), a mobile identification number (MIN), and an extension code (XC).

The ESN uniquely identifies wireless phone 102, as is well known. In conventional systems, the MIN identifies a single wireless phone. However, in the present invention, the MIN identifies multiple wireless phones. According to the present invention, a wireless phone is uniquely identified by the combination of the MIN and XC. Hereinafter, the combination of the MIN and XC is referred to as the extended MIN (EMIN).

Figure 3:
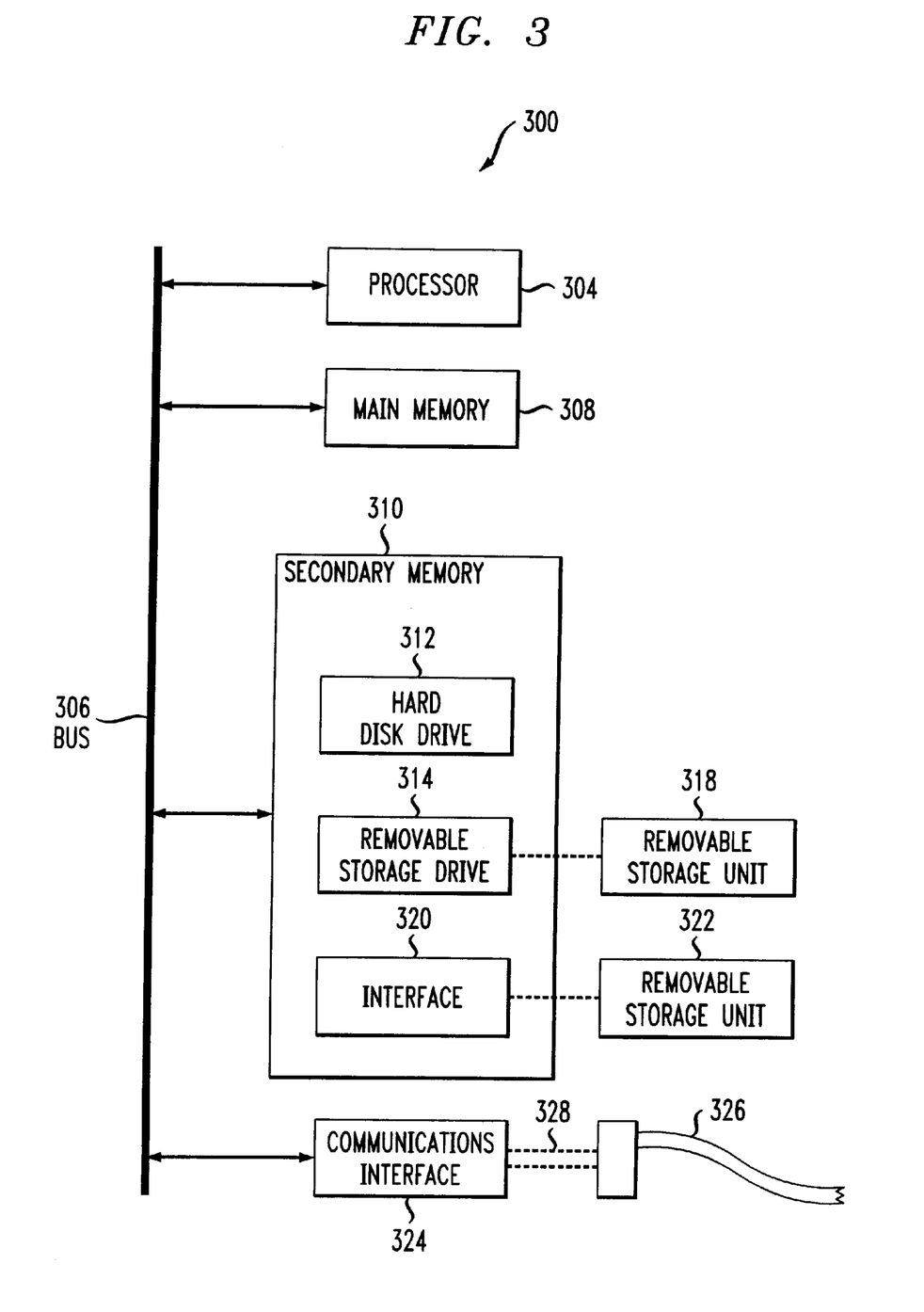
FIG. 3 depicts an exemplary processor which may be used in a wireless phone, mobile switching center, or service control point according to the present invention.

In a preferred embodiment, each of wireless phone 102, MSC 106, and SCP 108 includes a processor. FIG. 3 depicts an exemplary processor which may be used in any of these devices. The functions of these processors may be implemented using hardware, software or a combination thereof and may be implemented in a computer system or other processing system. In fact, in one embodiment, the invention is directed toward one or more computer systems capable of carrying out the functionality described herein. An example computer system 300 is shown in FIG. 3. The computer system 300 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals which can be electronic, electromagnetic, optical or other signals capable of being received by communications interface 324. These signals 326 are provided to communications interface 324 via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Figure 4:
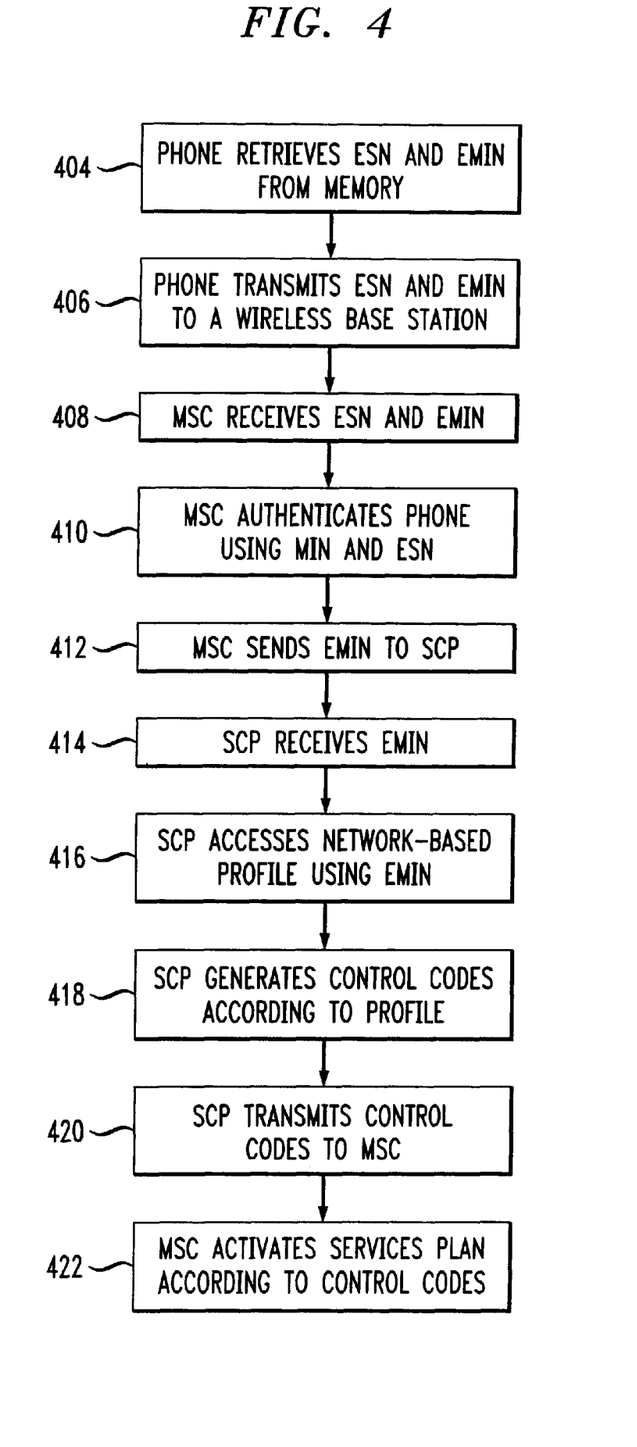
FIG. 4 is a flowchart depicting a registration process according to a preferred embodiment of the present invention.

FIG. 4 is a flowchart depicting a registration process for apparatus 100 according to a preferred embodiment of the present invention. The registration process can be initiated in a number of ways, for example, when the wireless phone is turned on, when a wireless phone that is on moves between wireless service areas, when an inbound call is received, when an outbound call is placed, periodically according to a schedule, or when the profile for the phone is modified.

When the registration process is initiated, wireless phone 102 retrieves the ESN and EMIN from memory 208, as shown in step 404, and transmits these parameters to wireless base station 104, as shown in step 406. The wireless base station transfers this data to a mobile switching center (MSC), such as MSC 106. MSC 106 receives the ESN and EMIN, as shown in step 408, and authenticates wireless phone 102 using these parameters according to methods well known in the relevant arts, as shown in step 410. Alternatively, the wireless phone can be authenticated by SCP 108. MSC 106 sends the EMIN to a service control point (SCP), such as SCP 108, as shown in step 412.

SCP 108 receives the EMIN, as shown in step 414, and uses the EMIN to access a network-based profile 110 for wireless phone 102, as shown in step 416. In one embodiment, a profile exists for each wireless phone. In an alternative embodiment, a single profile can exist for all of the phones having the MIN, in which case the extension code is not required to access the profile. In one embodiment, SCP 108 accesses the profile via a TCP/IP network such as the Internet. SCP 108 uses the profile to generate a set of control codes for wireless phone 102, as shown in step 418. SCP 108 transmits these control codes to MSC 106, as shown in step 420. MSC 106 then activates the service plan according to the control codes, as shown in step 422.

Figure 5:
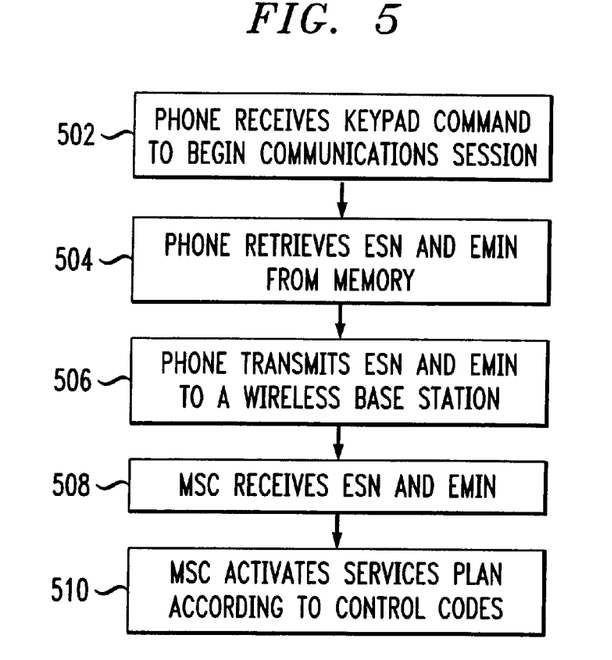
FIG. 5 is a flowchart depicting an outbound call process according to a preferred embodiment of the present invention.

FIG. 5 is a flowchart depicting an outbound call process for apparatus 100 according to a preferred embodiment of the present invention. An outbound call process begins when a user of wireless phone 102 enters commands by depressing buttons on keypad 210 of wireless phone 102. Wireless phone 102 receives the keypad command to begin the communication session, as shown in step 502.

Wireless phone 102 then retrieves the ESN and EMIN from memory 208, as shown in step 504, and transmits these parameters to a wireless base station, as shown in step 506. The wireless base station transfers this data to a mobile switching center (MSC), such as MSC 106. MSC 106 receives the ESN and EMIN, as shown in step 508. MSC 106 then activates a services plan according to the control codes. The process by which an MSC activates a services plan according to control codes is well-known in the relevant arts.

Figure 6:
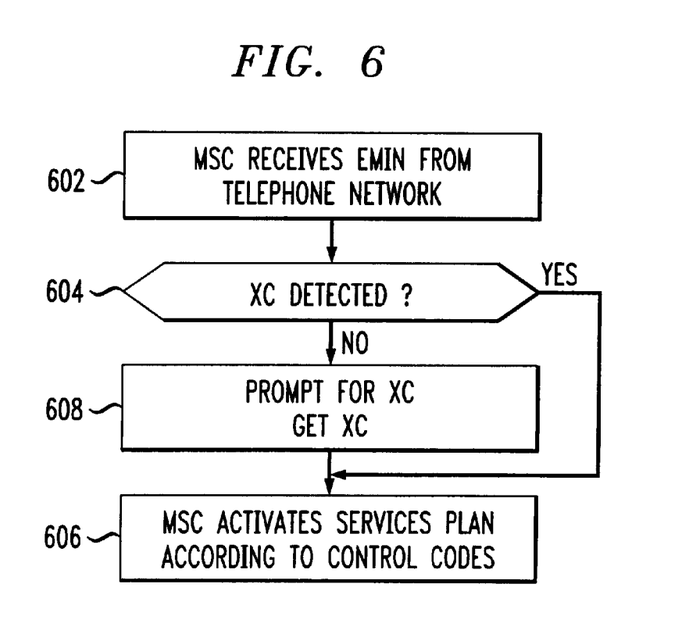
FIG. 6 is a flowchart depicting an inbound call process according to a preferred embodiment of the present invention.

FIG. 6 is a flowchart depicting an inbound call process for apparatus 100 according to a preferred embodiment of the present invention. An inbound call is connected through PSTN 112 to MSC 106. MSC 106 receives the MIN from PSTN 112, as shown in step 602. In one embodiment, the caller enters the MIN and XC together as a single data entry. For example, the MIN may be entered, followed by a character such as "*", followed by the XC. MSC 106 checks for the XC, as shown in step 604. If MSC 106 receives both the MIN and XC from PSTN 112, then MSC 106 activates the services plan according to the control codes received from SCP 108 during registration of wireless phone 102, as shown in step 606.

In another embodiment, MSC 106 receives the MIN and XC separately, according to the following exemplary process. MSC 106 receives the MIN from PSTN 112. MSC 106 checks for the XC, as shown in step 604 and causes the caller to be prompted to enter the extension code if it does not receive the XC, as shown in step 608. In a preferred embodiment, this prompt is a voice-prompt which is delivered to the caller by voice response unit (VRU) 114. In response, the caller enters or speaks the XC, which is transferred by PSTN 112 to MSC 106. Then MSC 106 activates the services plan according to the control codes received from SCP 108 during registration of wireless phone 102, as shown in step 606. In other embodiments, the prompt can be delivered to the caller's phone as a message in a protocol such as cellular digital packet data (CDPD) or short message service (SMS). The caller's phone includes a liquid crystal display (LCD), which displays the different extensions available for the dialed MIN to the caller. The caller then selects one or more of the extensions. Of course, the caller can originate the call using a conventional telephone, wireless phone, personal computer using Internet Telephony or the like.

CONCLUSION

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus comprising:
   a wireless phone including an electronic serial number (ESN) and an extended mobile identification number (EMIN), the EMIN including a mobile identification number (MIN) identifying a plurality of wireless phones and an extension code identifying the wireless phone, the plurality of wireless phones including the wireless phone;
   an adjunct processor that generates control codes according to a network-based profile identified by the EMIN; and
   a mobile switching center that activates a services plan according to the control codes, thereby providing telecommunication service access to the wireless phone.

2. An apparatus comprising:
   means for receiving from a switch in a wireless telephone network, an extended mobile identification number (EMIN), the EMIN including a mobile identification number (MIN) identifying a plurality of wireless phones and an extension code identifying a predetermined one of the plurality of wireless phones;
   means for accessing a network-based profile for the predetermined wireless phone using the EMIN;
   means for generating control codes according to the network-based profile; and
   means for transmitting the control codes to the switch.

3. An apparatus comprising:
   means for receiving an electronic serial number (ESN) and an extended mobile identification number (EMIN), the EMIN including a mobile identification number (MIN) identifying a plurality of wireless phones and an extension code identifying a predetermined one of the plurality of wireless phones;
   means for sending the EMIN to an adjunct processor;
   means for receiving control codes associated with the EMIN from the adjunct processor; and
   means for providing telecommunication services to the predetermined wireless phone according to the control codes.

4. The apparatus of claim 3, wherein the adjunct processor generates the control codes according to a network-based profile associated with the MIN.

5. The apparatus of claim 4, wherein the network-based profile can be managed by a user of the predetermined wireless phone.

6. The apparatus of claim 5, further comprising:
   means for authenticating the predetermined wireless phone using the EMIN and ESN.

7. The apparatus of claim 6, wherein the EMIN is received from a telephone network.

8. The apparatus of claim 7, further comprising:
   means for transmitting, to a wireless base station, a paging message including the EMIN.

9. The apparatus of claim 3, wherein said means for receiving comprises:
   means for receiving the MIN;
   means for causing the caller to be prompted to enter the extension code; and
   means for receiving the extension code.

10. A method comprising:
    transmitting from a wireless phone an electronic serial number (ESN) and an extended mobile identification number (EMIN), the EMIN including a mobile identification number (MIN) identifying a plurality of wireless phones and an extension code identifying the wireless phone, the plurality of wireless phones including the wireless phone;
    generating, at an adjunct processor, control codes according to a network-based profile identified by the EMIN; and
    activating, at a mobile switching center, a services plan according to the control codes, thereby providing telecommunication service access to the wireless phone.

11. A method comprising:
    receiving from a switch in a wireless telephone network, an extended mobile identification number (EMIN), the EMIN including a mobile identification number (MIN) identifying a plurality of wireless phones and an extension code identifying a predetermined one of the plurality of wireless phones;
    accessing a network-based profile for the predetermined wireless phone using the EMIN;
    generating control codes according to the network-based profile; and
    transmitting the control codes to the switch.

12. A method comprising:
    receiving an electronic serial number (ESN) and an extended mobile identification number (EMIN), the EMS including a mobile identification number (MIN) identifying a plurality of wireless phones and an extension code identifying a predetermined one of the plurality of wireless phones;
    sending the EMIN to an adjunct processor;
    receiving control codes associated with the EMIN from the adjunct processor; and
    providing telecommunication services to the predetermined wireless phone according to the control codes.

13. The method of claim 12, wherein the adjunct processor generates the control codes according to a network-based profile associated with the MIN.

14. The method of claim 13, wherein the network-based profile can be managed by a user of the predetermined wireless phone.

15. The method of claim 14, further comprising:
    authenticating the predetermined wireless phone using the EMIN and ESN.

16. The method of claim 15, wherein the EMIN is received from a telephone network.

17. The method of claim 16, further comprising:
    transmitting, to a wireless base station, a paging message including the EMIN.

18. The method of claim 12, wherein said receiving step comprises:
    receiving the MIN;
    causing the caller to be prompted to enter the extension code; and
    receiving the extension code.

19. A computer program product comprising a computer usable medium having computer readable program code means embodied in said medium, said computer readable program code means comprising:
    computer readable program code means for causing a computer to receive from a switch in a wireless telephone network, an extended mobile identification number (EMIN), the EMIN including a mobile identification number (MIN) identifying a plurality of wireless phones and an extension code identifying a predetermined one of the plurality of wireless phones;

computer readable program code means for causing a computer to access a network-based profile for the predetermined wireless phone using the EMIN;

computer readable program code means for causing a computer to generate control codes according to the network-based profile; and computer readable program code means for causing a computer to transmit the control codes to the switch.

20. A computer program product comprising a computer usable medium having computer readable program code means embodied in said medium, said computer readable program code means comprising:

computer readable program code means for causing a computer to receive an electronic serial number (ESN) and an extended mobile identification number (EMIN), the EMIN including a mobile identification number (MIN) identifying a plurality of wireless phones and an extension code identifying a predetermined one of the plurality of wireless phones;

computer readable program code means for causing a computer to send the EMIN to an adjunct processor;

computer readable program code means for causing a computer to receive control codes associated with the EMIN from the adjunct processor; and computer readable program code means for causing a computer to provide telecommunication services to the predetermined wireless phone according to the control codes.

21. The computer program product of claim 20, wherein the adjunct processor generates the control codes according to a network-based profile associated with the MIN.

22. The computer program product of claim 21, wherein the network-based profile can be managed by a user of the predetermined wireless phone.

23. The computer program product of claim 22, further comprising:

computer readable program code means for causing a computer to authenticate the predetermined wireless phone using the EMIN and ESN.

24. The computer program product of claim 23, wherein the EMIN is received from a telephone network.

25. The computer program product of claim 24, further comprising:

computer readable program code means for causing a computer to transmit, to a wireless base station, a paging message including the EMIN.

26. The computer program product of claim 20, wherein said computer readable program code means for causing a computer to receive comprises:

computer readable program code means for causing a computer to receive the MIN;

computer readable program code means for causing a computer to cause the caller to be prompted to enter the extension code; and computer readable program code means for causing a computer to receive the extension code.

* * * * *

UNITED STATES PATENT AND TRADEMARK OFFICE
CERTIFICATE OF CORRECTION

PATENT NO.    : 6,501,946 B1
DATED         : December 31, 2002
INVENTOR(S)   : Jeffrey J. Farah and Bernard S. Renger It is certified that error appears in the above-identified patent and that said Letters Patent is hereby corrected as shown below:

Column 8,
Line 31, "EMS" is changed to -- EMIN --

Signed and Sealed this

Twenty-seventh Day of May, 2003

JAMES E. ROGAN
*Director of the United States Patent and Trademark Office*